US007698628B2

(12) United States Patent
Perelman et al.

(10) Patent No.: US 7,698,628 B2
(45) Date of Patent: Apr. 13, 2010

(54) METHOD AND SYSTEM TO PERSIST STATE

(75) Inventors: Roberto Perelman, Sunnyvale, CA (US); Christopher T. Solc, Ontario (CA); Anatole A. Matveief, San Jose, CA (US); Jeff Young, San Jose, CA (US); John P. Brinkman, Ontario (CA)

(73) Assignee: Adobe Systems Incorporated, San Jose, CA (US)

( * ) Notice: Subject to any disclaimer, the term of this patent is extended or adjusted under 35 U.S.C. 154(b) by 242 days.

(21) Appl. No.: 11/475,531

(22) Filed: Jun. 26, 2006

(65) Prior Publication Data

US 2007/0300145 A1 Dec. 27, 2007

(51) Int. Cl.
G06F 17/00 (2006.01)
(52) U.S. Cl. ............... 715/221; 715/707; 715/756; 707/203
(58) Field of Classification Search .......... 715/221–226
See application file for complete search history.

(56) References Cited

U.S. PATENT DOCUMENTS

| | | | |
|---|---|---|---|
| 6,651,217 B1 | 11/2003 | Kennedy et al. | |
| 7,197,515 B2 * | 3/2007 | Rivers-Moore et al. | 707/200 |
| 7,216,292 B1 * | 5/2007 | Snapper et al. | 715/236 |
| 7,500,178 B1 * | 3/2009 | O'Donnell | 715/221 |
| 2004/0237030 A1 * | 11/2004 | Malkin | 715/505 |
| 2004/0267813 A1 | 12/2004 | Rivers-Moore et al. | |
| 2006/0136810 A1 * | 6/2006 | Truong et al. | 715/507 |

FOREIGN PATENT DOCUMENTS

WO WO-2008002453 A2 1/2008

OTHER PUBLICATIONS

"International Application Serial No. PCT/US2007/14494, International Search Report and Written Opinion mailed Jul. 31, 2008", P237,9 pgs.
Adobe, "XFA Specification—Version 2.2", (Oct. 1, 2004), 744 pgs.

* cited by examiner

*Primary Examiner*—Doug Hutton
*Assistant Examiner*—Quoc A Tran
(74) *Attorney, Agent, or Firm*—Schwegman Lundberg & Woessner, P.A.

(57) ABSTRACT

A system, to persist state in a dynamic electronic form, may include a communications module to receive a request to load an electronic form, a merge module to merge a template associated with the electronic form and data values associated with the electronic form, a delta extractor to access delta data associated with the electronic form, and an overlay module to overlay the delta data onto the electronic form. The delta data, in an example embodiment, includes attributes and properties associated with the electronic form that are being designated to persist between editing sessions of the electronic form.

19 Claims, 5 Drawing Sheets

METHOD AND SYSTEM TO PERSIST STATE

TECHNICAL FIELD

This application relates to a method and system to persist state in a dynamic electronic form.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In an architecture that distinguishes between an electronic form template and electronic form content, the template and content associated with the electronic form may be stored separately. As a result, any transient session data associated with the form may not be preserved between sessions.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
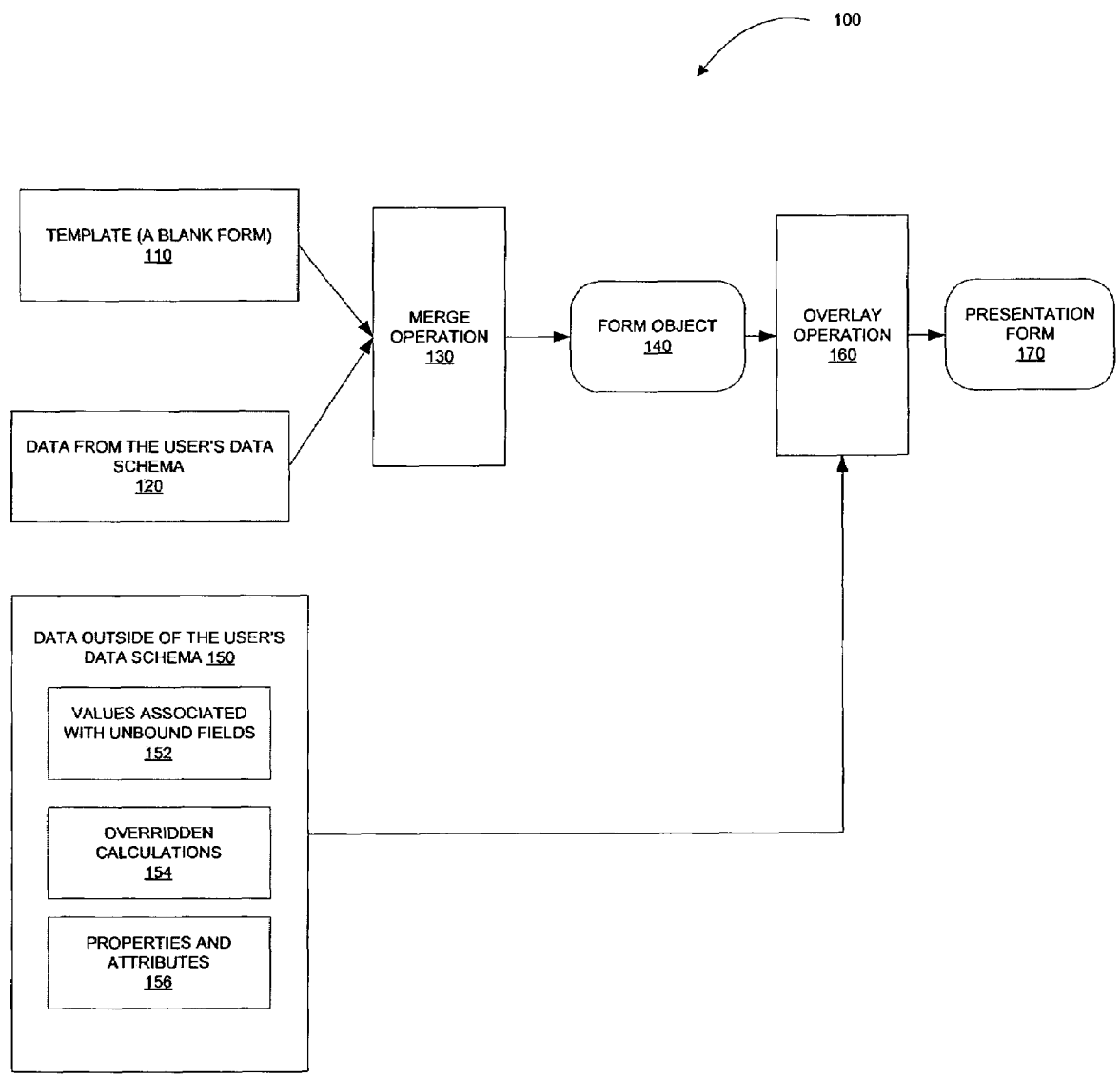
FIG. 1 shows an architecture to persist state in a dynamic electronic form, in accordance with an example embodiment.

An electronic form may, in many cases, embody a complex "application packaged as a document" that may utilize a template-based grammar where the template associated with an electronic form defines presentation, calculations and interaction rules, while the content of the electronic form comprises the application data of the user. Though they are often packaged together, a template and the content of an electronic form may be separate entities. In order to load a previously saved electronic form, the template associated with the electronic form is merged with the user's content.

Application data of a user may include the electronic form field values that are mapped to the respective fields in the template. Such mapping determines which electronic form field values are to be saved in an electronic form content repository and is also used to populate the fields of the template when a user requests loading of the electronic form.

Persisting the electronic form field values alone, while preserving the purity of the user's application data, fails to capture the complete state of the electronic form, because the complete state of an electronic form may include additional changes that may have occurred during an edit session. For example, a user may enter custom data into an electronic form field that is not associated with any item in the application data of the user (e.g., an unbound field). A user may also choose to override a pre-calculated value in an electronic form field. As a result, the custom value in an unbound field and the overridden calculation will not be reproduced the next time the electronic form is loaded via a merging process of the template and user's application data. For the purposes of this description, any data related to the electronic form that is not designated to be saved as part of the user's application data is referred to as attributes and properties of the electronic form or the session information.

When a user requests to load an electronic form that has been previously saved in the context of an architecture that distinguishes between the template and the data, it may be desirable to restore the electronic form state that includes the properties and the attributes of the electronic form, in addition to restoring the electronic form field values that were saved as part of the application data. In order to accomplish this, it may be possible to add scripts to the template such that the scripts run when the electronic form opens and restore some of the properties of the electronic form. This approach, however, may add complexity to the task of designing an electronic form and may also require saving extra data values that are outside of the application data (thereby "polluting" it), just to capture the session information.

Example methods and systems are presented to persist electronic form state that are automatic to the extent possible, and that does not require polluting the application data with transient session-related values.

In an example embodiment, a system to persist state in a dynamic electronic form may utilize a repository for session-related data, in addition to a regular data repository that stores application data. The data stored in such an additional repository may be referred to as the attributes and properties of an electronic form, and may be termed "delta objects" or "deltas." Deltas may be stored in a delta document object model (DOM) and may comprise the changes made to the electronic form that are not already captured in the regular data repository. When the electronic form is being reopened, the associated template and the user's application data are merged to produce a run time representation of the electronic form. After the merge operation is completed, but prior to performing any calculations required by the template, the value of each delta may be pushed onto the appropriate electronic form component. Consequently, a state saved in the deltas may be overlaid onto the newly merged electronic form, hence restoring a previous state of the electronic form.

In an example embodiment, the system to persist the state in a dynamic electronic form may be implemented in the context of the eXtensible Markup Language (XML) Forms Architecture (XFA). XFA provides a template-based grammar and a set of processing rules that may allow the implementing of interactive electronic forms. A template-based grammar may define fields, in which a user provides data, thereby permitting the user to interact with the electronic form by supplying values and selecting options.

XFA distinguishes between an electronic form template and electronic form content. A template, typically, may define presentation, calculations and interaction rules for the electronic form, while the electronic form content may represent a user's application data as well as any session related data. Although an electronic form template and electronic form content are often packaged together, an electronic form template and electronic form content may exist as separate entities.

An XFA form may include static content and dynamic content. The static content is defined in the template and may include lines, rectangles and text, for example. The content defined in a template may, in an example embodiment, be manipulated by script. The dynamic content may be content that is defined later, e.g., when the data is merged with the template or when the electronic form field values are filled in by an end-user.

When a blank electronic form associated with a template is first loaded, a user sees an interactive electronic form that represents the layout, graphics, and fields defined in the XFA template. Initially, the only data in the electronic form are default values defined in the template. When an XFA processing application introduces data to an XFA form, it associates each item from the user's application data with a respective dynamic container, such as a field or a subelectronic form. The process of associating a data item with a dynamic container may be termed "data binding."

In an example embodiment, the XFA processing model takes the XFA data DOM and the template DOM, and merges them together to produce a sparse DOM called the electronic form DOM. All runtime changes, whether caused by the execution of a script or by data entry to the document, are stored in the electronic form DOM. The electronic form DOM may also maintain two-way relationships between the electronic form field values and the XFA data DOM. Thus, while any change to a field value that is associated with the data DOM is saved back to the data stream that is saved as part of the electronic form (e.g., in a Portable Document Electronic format (PDF)), the electronic form DOM itself is not being saved.

In order to persist state information across edit sessions for an electronic form, a technique may be utilized to extend the XML and the scripting syntax for the XFA. In an example embodiment, a user may be permitted to designate in the template certain field data and certain page content to be saved as delta data and restored when requested. For example, if a user is permitted to override the calculated value of a field, the new value in such a field may be designated as delta data so that it would persist between edit sessions. In an example embodiment, a field with an associated calculated value may have an indicator providing information regarding whether the calculated value has been overridden and that the calculation for the field should not execute next time the electronic form is being loaded.

For XFA documents, any property of any component in the electronic form DOM can change, e.g., via a user input, and thus affect the visual representation of the document. A common example is a change to the border color of a field. In an example embodiment, the type of the electronic form may be taken into consideration when the properties of the electronic form are being restored. For certified documents, where only the template definition and document resources are covered by the document signature, the template for a certified document may be designed to include the logic to verify every change that needs to be restored. In order to accomplish this, in an example embodiment, the state information for a certified electronic form may be saved and then manually restored using either scripting or a declarative solution. For non-certified documents, where security is not as important, the logic required to restore the state information does not have to be included in the template definition and thus the saving and restoring of the state information for the electronic form may be performed automatically.

An example architecture 100 to persist state in a dynamic electronic form is illustrated in FIG. 1. In the context of the architecture 100, in an example embodiment, a template 110 representing a blank electronic form is merged with user data 120 in a process of binding, utilizing a merge operation 130.

The result of the merge operation 130, an electronic form object 140, is processed further by an overlay operation 160. The overlay operation 160 acts on the electronic form object 140 by overlaying any delta data 150 that may be designated as persisting data even though this delta data is not part of the application data.

As mentioned above, the delta data 150 may include values of electronic form fields that are not reflected in the data 120, e.g., the values of unbound electronic form fields 152. The delta data 150 may further include values 154 associated with overridden calculations, characteristics 156 affecting the appearance of the electronic form, as well as other data values that not part of the application data (collectively referred to as the attributes and the properties of the electronic form). Returning to FIG. 1, the result of the overlay operation 160 is a presentation electronic form 170 that reflects not only the application data, but also some or all of the properties and attributes of the electronic form.

Figure 2:
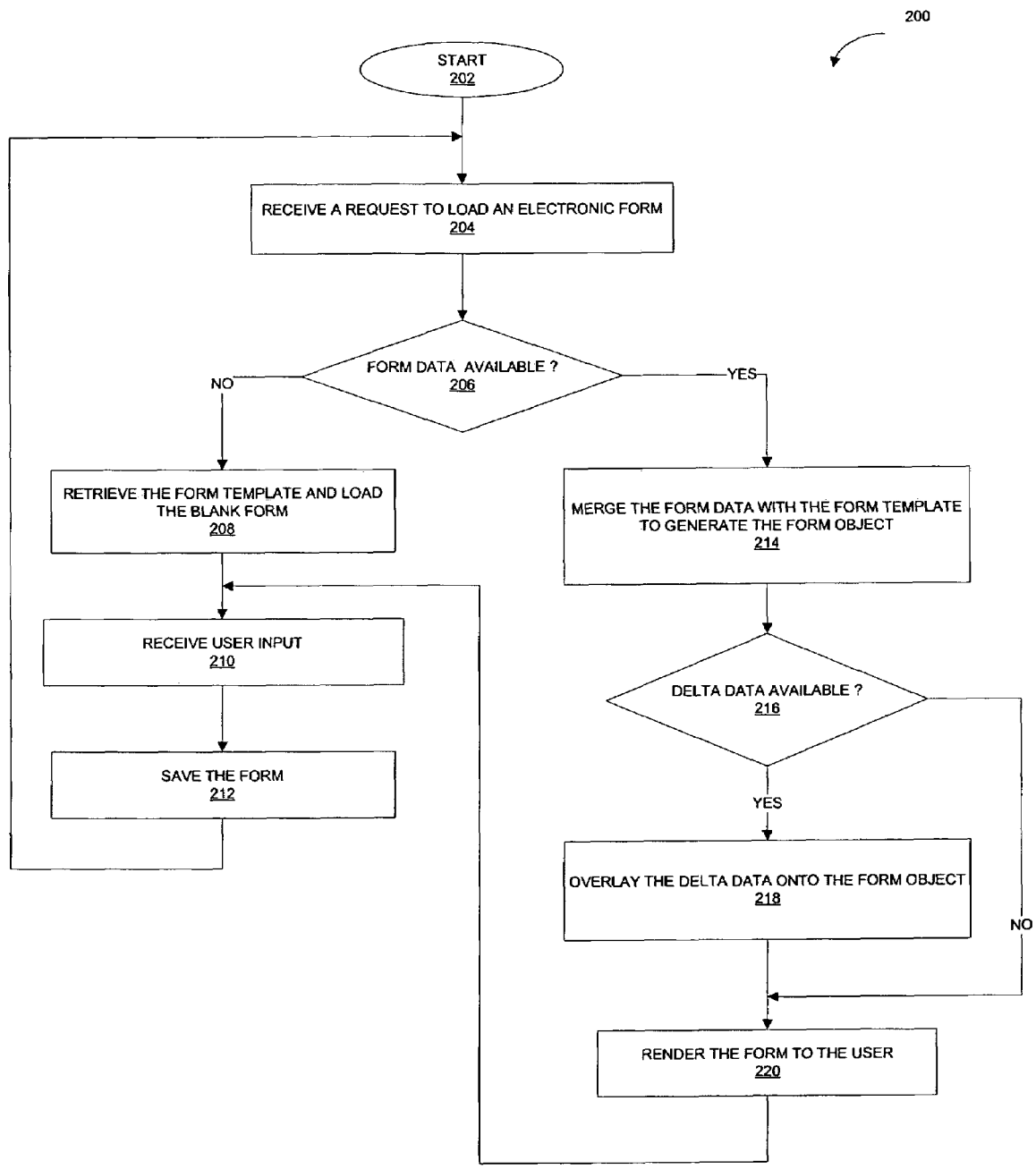
FIG. 2 is a flow chart illustrating a method, in accordance with an example embodiment, to permit a user to interact with a dynamic electronic form.

An example method to permit a user to interact with a dynamic electronic form is described with reference to FIG. 2. FIG. 2 is a flow chart of a method 200, according to an example embodiment. The method 200 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 4 described below.

As shown in FIG. 2, the method 200 commences at operation 202. At operation 204, the processing logic receives a request to load an electronic form when a user directs an XFA processing application to open an XFA form. The application then goes through the following general steps. The XFA processing application uses the XFA template to determine the initial electronic form appearance and to obtain default data. The data is then associated with specific fields. If it is determined, at operation 206, that there is no application data to be included in the XFA form, the application loads a blank electronic form based on the associated template at operation 208. The loaded electronic form, in an example embodiment, is represented by an electronic form DOM.

At operation 210, the electronic form DOM receives user input. The user may provide data by bringing a field of the electronic form into focus and then entering data. A field can be brought into focus, e.g., by using a mouse to select the field or by using keyboard sequences. The electronic form is then updated with the newly entered data. The XFA processing application executes calculations and data validations for any fields whose values have changed.

After the user no longer needs to interact with the electronic form, the user may request that the electronic form is saved and closed. The electronic form is saved at operation 212. It will be noted that, according to an example embodiment, any changes that were made to the electronic form during an edit session are saved and stored separately from the template associated with the electronic form.

If it is determined, at operation 206, that there is application data available to be included in the XFA form, the application merges the associated template with the user's data at operation 214. At operation 216, the application determines whether any of the attributes and properties of the electronic form (e.g., any data that is related to the electronic form, but is not part of the application data), have been designated to persist between the editing sessions as delta data. In response to a positive determination at operation 216, the application accesses the stored attributes and properties of the electronic form, overlays the delta data onto the electronic form object at operation 228, performs all necessary calculations and renders the resulting electronic form to the user at operation 220.

If it is determined, at operation 216, that no delta data is available, the application renders the electronic form as generated at operation 214. The method 200 may continue to operation 210 to permit the user to interact with the electronic form. The electronic form data received via user input, as well as the state of the dynamic electronic form, may be saved, according to an example embodiment, as described with reference to FIG. 3.

Figure 3:
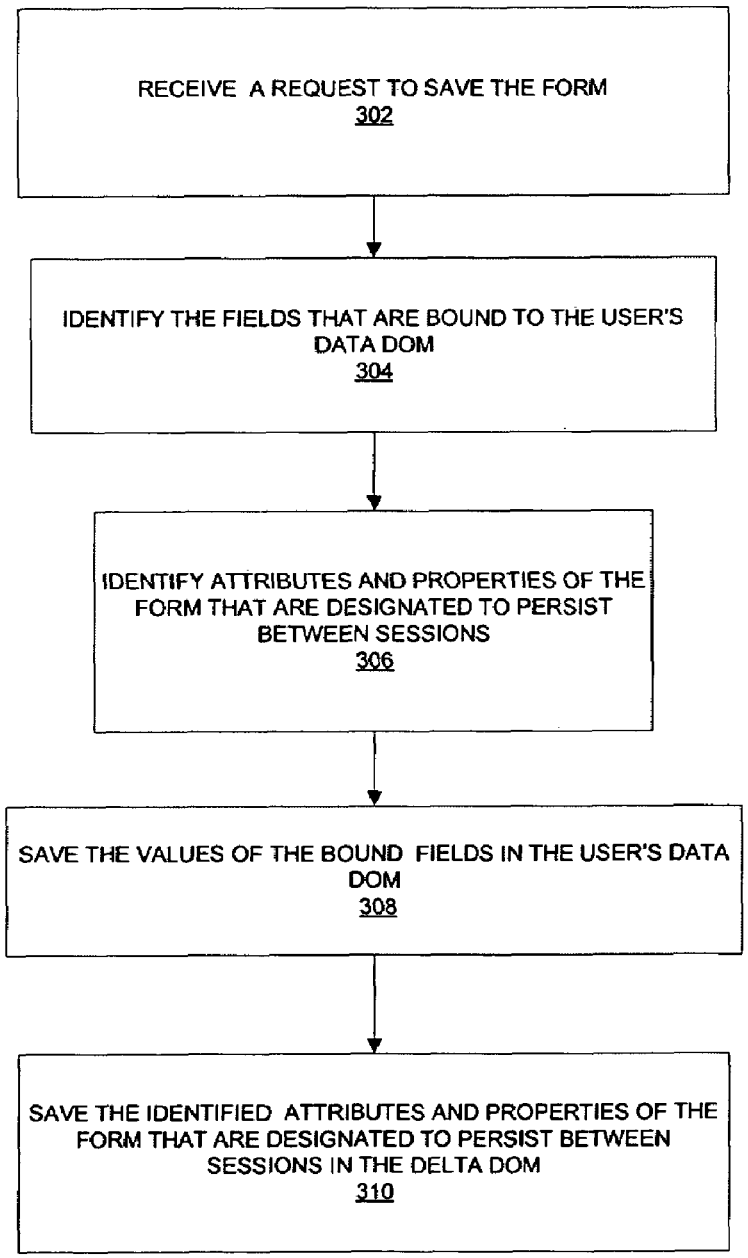
FIG. 3 is a flow chart illustrating a method to persist state in a dynamic electronic form, in accordance with an example embodiment.

FIG. 3 is a flow chart of a method 300 to persist state in a dynamic electronic form, according to an example embodiment. The method 300 may be performed by processing logic that may comprise hardware (e.g., dedicated logic, programmable logic, microcode, etc.), software (such as run on a general purpose computer system or a dedicated machine), or a combination of both.

As shown in FIG. 3, when an XFA processing application receives a request to save an XFA form (operation 302), the application identifies those data fields that are bound to the user's data DOM (operation 304). Next, the application identifies those attributes and properties of the electronic form that are designated to persist between the editing sessions (operation 306). At operation 308, the values of those data fields that are bound to the user's data DOM are saved in the user's data DOM. The values of the identified attributes and properties of the electronic form that are designated to persist between the editing sessions are saved in a separate repository, e.g., a delta DOM, at operation 310. It will be noted, that the operations illustrated in FIG. 3 may be performed in an order other than the order listed in the example embodiment herein. For example, the processing logic may identify and save the values of the bound fields first and subsequently identify and save any existing delta data.

Figure 4:
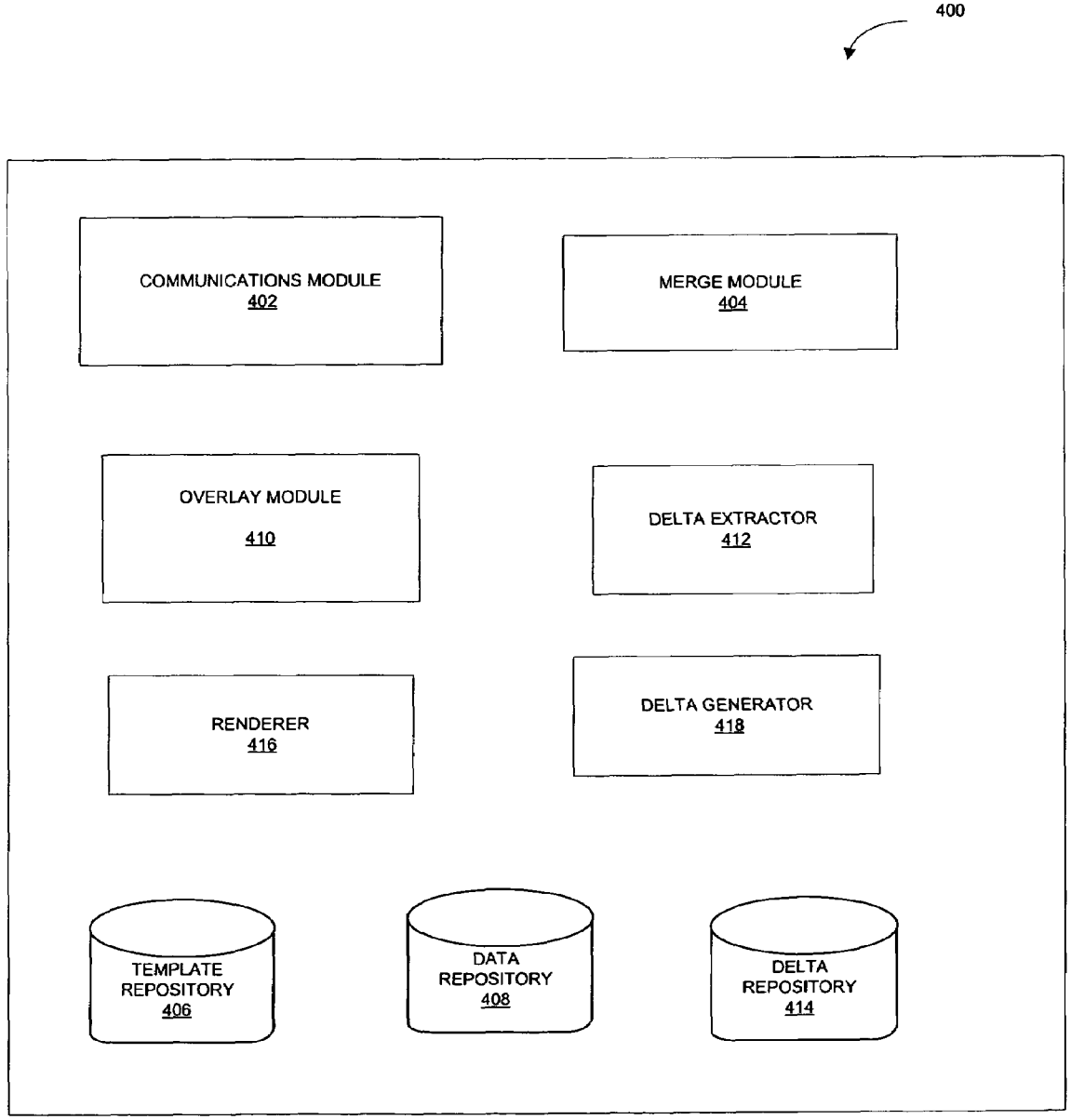
FIG. 4 is a block diagram illustrating a system, in accordance with an example embodiment, to persist state in a dynamic electronic form.

The operations illustrated in FIG. 2 and FIG. 3 may be described with reference to FIG. 4. FIG. 4 is a block diagram illustrating a system 400 to persist state in a dynamic electronic form, in accordance with an example embodiment. In an example embodiment, the system 400 comprises modules of an XFA processing application. Specifically, the system 400 comprises a communications module 402 to receive communications from a user, a merge module 404, an overlay module 410, a delta extractor 412, a renderer 416 and a delta generator 418.

The communications module 402 may be configured to receive communications from a user, such as a request from a user to load an electronic form or data input from a user. When the communications module 402 receives a request to load an electronic form, the communications module 402 passes control to the merge module 404. The merge module 404 may be configured to merge a template associated with the requested electronic form with the application data associated with the electronic form. The merge operation, in an example embodiment, results in a Form DOM being generated. The template may be stored in a templates repository 406, while the application data may be stored in a data repository 408, e.g., a Data DOM. The merge component 404 may also be configured to determine that additional data, that is not part of the application data, was designated to persist between the editing sessions (e.g., delta data or delta) and pass control to the overlay module 410. The overlay module 406 may be configured to cooperate with the delta extractor 412. The delta extractor 412 may retrieve the delta data from a delta repository 414 (e.g., a Delta DOM), so that the overlay module 410 may overlay the delta data onto the Form DOM. The renderer 416 then renders the electronic form to the user.

When a user completes an editing session and requests that the electronic form is saved for future access, the values associated with bound fields in the electronic form are stored in the data repository 408. The delta generator 418 may parse the electronic form to determine attributes and properties associated with the electronic form that are designated to persist between sessions and save the determined attributes and properties in the delta repository 414. The next time a user requests to load the saved electronic form, the loaded electronic form exhibits not only the user's data but also the attributes and properties of the electronic form that were saved as delta data.

It will be noted that, although some example embodiments of the invention have been described in the context of the XFA architecture, the techniques herein may be utilized advantageously with a variety of applications related to providing electronic forms to users.

Figure 5:
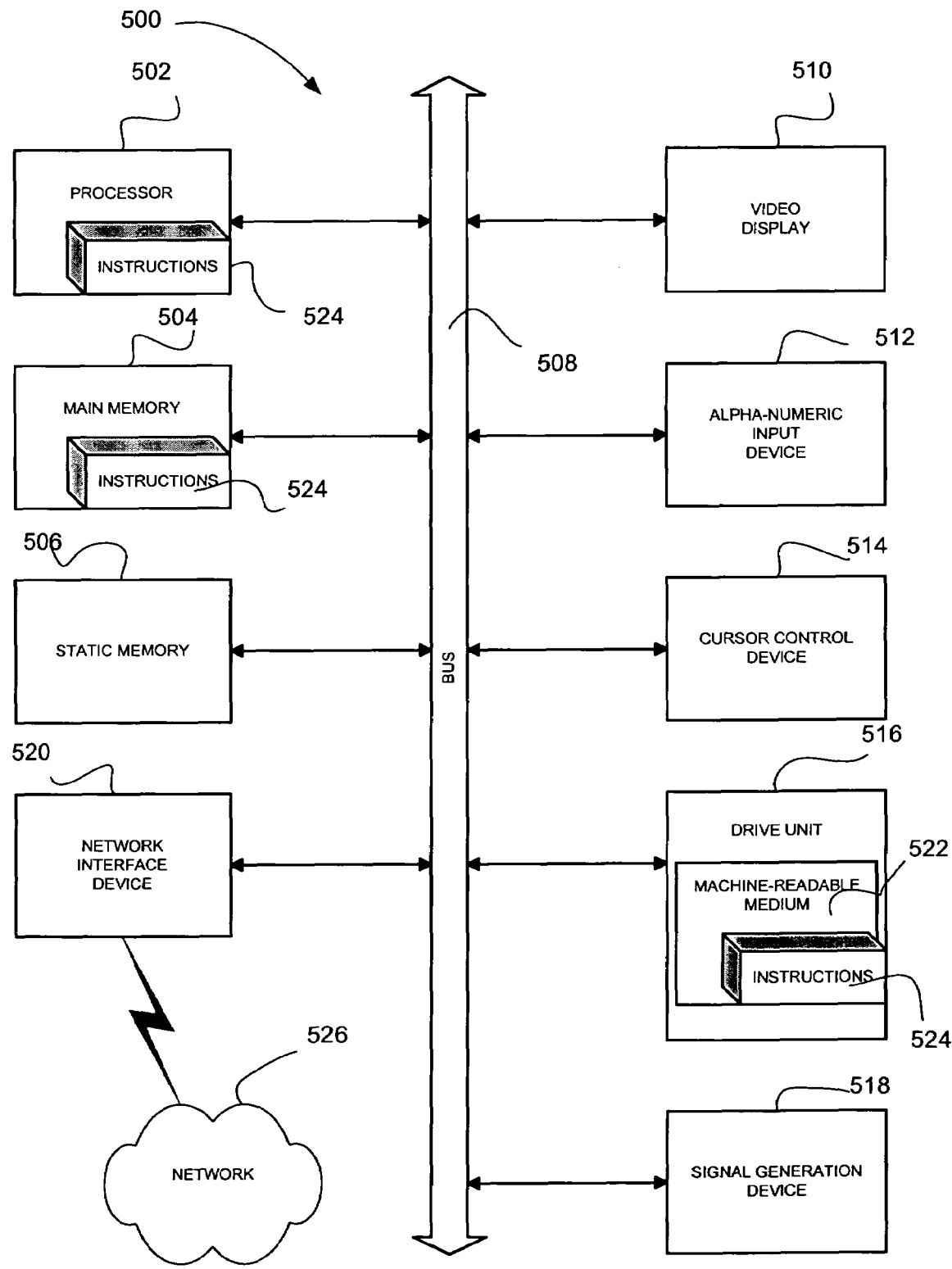
FIG. 5 illustrates a diagrammatic representation of a machine in the example form of a computer system within which a set of instructions, for causing the machine to perform any one or more of the methodologies discussed herein, may be executed.

FIG. 5 shows a diagrammatic representation of a machine in the example electronic form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding a set of instructions for execution by the machine and that cause the machine to perform any one or more of the methodologies of the present invention, or that is capable of storing, encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
a communications module implemented, at least partially, in hardware to receive a request to load an electronic form that reflects data values associated with one or more fields of the electronic form and also reflects attributes and properties of the electronic form,
the attributes and properties comprising data associated with the electronic form that is not designated to be saved as part of user's application data, the attributes and properties including saved attributes and properties designated to persist between editing sessions of the electronic form;
a merge module implemented, at least partially, in hardware to merge a template associated with the electronic form and the data values associated with the electronic form, the template corresponding to a blank unmodified version of the electronic form, to generate a form object;
a delta extractor implemented, at least partially, in hardware to access delta data associated with the electronic form, the delta data comprising the saved attributes and properties associated with the electronic form,
the delta data being stored separately from the template and from the data values; and
an overlay module implemented, at least partially, in hardware to overlay the delta data onto the form object to generate the electronic form.

2. The system of claim 1, wherein the delta data includes a value associated with an unbound field in the electronic form.

3. The system of claim 1, wherein the delta data includes a value associated with an overridden calculation in the electronic form.

4. The system of claim 1, wherein the delta data includes a value associated with a visual characteristic of the electronic form.

5. The system of claim 1, wherein the communications module is to receive an input, the system further comprising:
a data repository to store values associated with bound fields in the electronic form;
a delta generator to determine attributes and properties associated with the electronic form that are designated to persist between editing sessions of the electronic form; and
a delta repository to store the determined attributes and properties.

6. The system of claim 5, wherein the values associated with the bound fields in the electronic form comprise application data.

7. The system of claim 1, further comprising a renderer to render the electronic form.

8. The system of claim 1, wherein the renderer is to render the electronic form in a Portable Document Format (PDF).

9. The system of claim 1, wherein the attributes and properties of the electronic form are not part of application data.

10. A method comprising:
receiving a request to load an electronic form that reflects data values associated with one or more fields of the electronic form and also reflects attributes and properties of the electronic form,
the attributes and properties comprising data associated with the electronic form that is not designated to be saved as part of user's application data, the attributes and properties including saved attributes and properties designated between editing sessions of the electronic form to persist beyond the earlier editing session of the electronic form;
merging a template associated with the electronic form and the data values associated with the electronic form;
accessing delta data associated with the electronic form, the delta data comprising the saved attributes and properties associated with the electronic form; and
overlaying the delta data onto the electronic form.

11. The method of claim 10, wherein the delta data includes a value associated with an unbound field in the electronic form.

12. The method of claim 10, wherein the delta data includes a value associated with an overridden calculation in the electronic form.

13. The method of claim 10, wherein the delta data includes a value associated with a visual characteristic of the electronic form.

14. The method of claim 10, further comprising:
receiving an input;
saving values associated with bound fields in the electronic form in a data repository, wherein a bound field in the electronic form has an associated mapping to an item in the data repository;
determining attributes and properties associated with the electronic form that are designated to persist between editing sessions of the electronic form; and
saving the determined attributes and properties in a delta repository.

15. The method of claim 14, wherein values associated with the bound fields comprise application data.

16. The method of claim 10, further comprising rendering the electronic form.

17. The method of claim 16, wherein the rendering of the electronic form comprises creating a representation of the electronic form in a Portable Document Format (PDF).

18. A machine-readable medium having instruction data to cause a machine to:
receive a request to load an electronic form that reflects data values associated with one or more fields of the electronic form and also reflects attributes and properties of the electronic form, the attributes and properties comprising data associated with the electronic form that is not designated to be saved as part of user's application data, the attributes and properties including saved attributes and properties designated to persist between editing sessions of the electronic form;

merge a template associated with the electronic form and data values associated with the electronic form;

access delta data associated with the electronic form, the delta data comprising the saved attributes and properties associated with the electronic form; and overlay the delta data onto the electronic form.

19. A system comprising:

hardware means for receiving a request to load an electronic form that reflects data values associated with one or more fields of the electronic form and also reflects attributes and properties of the electronic form, the attributes and properties comprising data associated with the electronic form that is not designated to be saved as part of user's application data, the attributes and properties including saved attributes and properties designated to persist between editing sessions of the electronic form;

hardware means for merging a template associated with the electronic form and data values associated with the electronic form;

hardware means for accessing delta data associated with the electronic form, the delta data comprising the saved attributes and properties associated with the electronic form; and hardware means for overlaying the delta data onto the electronic form.

* * * * *